United States Patent [19]
Harris

[11] Patent Number: 6,005,316
[45] Date of Patent: Dec. 21, 1999

[54] CURRENT MODE SWITCHING FOR TRI-STATE AMPLIFIERS IN MAGNETIC BEARING CONTROL SYSTEMS

[75] Inventor: Timothy A. Harris, Calgary, Canada

[73] Assignee: Revolve Magnetic Bearing Inc., Calgary, Canada

[21] Appl. No.: 09/208,501

[22] Filed: Dec. 10, 1998

Related U.S. Application Data

[63] Continuation of application No. PCT/CA98/00339, Apr. 9, 1998.

[30]    Foreign Application Priority Data

Apr. 11, 1997  [CA]   Canada ................................... 2202442

[51] Int. Cl.$^6$ .............................. F16C 39/06; F16C 32/04
[52] U.S. Cl. ........................... 310/90.5; 318/599; 330/75; 327/110
[58] Field of Search ......................... 310/90.5; 318/599, 318/293; 330/75; 327/10

[56]              References Cited

U.S. PATENT DOCUMENTS

| | | | |
|---|---|---|---|
| 4,020,361 | 4/1977 | Suelzle et al. | 307/106 |
| 4,496,886 | 1/1985 | Gordon et al. | 318/254 |
| 4,703,238 | 10/1987 | Palmin et al. | 318/563 |
| 4,710,686 | 12/1987 | Guzik | 318/293 |
| 4,732,353 | 3/1988 | Studer | 244/165 |
| 5,153,492 | 10/1992 | Landseadel | 318/599 |
| 5,225,789 | 7/1993 | Caine et al. | 310/90.5 |
| 5,262,692 | 11/1993 | Williams et al. | 310/90.5 |
| 5,400,239 | 3/1995 | Caine | 363/67 |
| 5,406,150 | 4/1995 | Austin | 327/110 |
| 5,457,364 | 10/1995 | Bilotti et al. | 318/434 |
| 5,471,106 | 11/1995 | Curtis et al. | 310/90.5 |
| 5,552,683 | 9/1996 | Dargent | 330/10 |
| 5,565,722 | 10/1996 | Rubner et al. | 310/90.5 |
| 5,627,421 | 5/1997 | Miller et al. | 310/90.5 |
| 5,649,814 | 7/1997 | Lund-lack | 417/423.7 |
| 5,682,071 | 10/1997 | Buhler et al. | 310/90.5 |
| 5,703,424 | 12/1997 | Dorman | 310/90.5 |

FOREIGN PATENT DOCUMENTS 0 395 116 A2  10/1990  European Pat. Off. ......... H02K 7/09

OTHER PUBLICATIONS

English translation of Abstract of EPO 59103019 to Hirotsugu, entitled "Control Circuit For Magnetic Bearing", filed Dec. 12, 1982, *Patent Abstracts of Japan*.

*Primary Examiner*—Clayton LaBalle
*Assistant Examiner*—B Mullins
*Attorney, Agent, or Firm*—Irah H. Donner; Pepper Hamilton LLP

[57]             ABSTRACT

A method of controlling switching of a tri-state switching amplifier having two switching legs, two switches in each leg, and a load connected to the junction between the switches of each leg, a power supply and a capacitor connected to the opposite ends of each leg, a first pair of the switches defining an idle state in which current circulates through the load and the first pair of switches, a second pair of the switches defining a Charge state in which the load is connected to the power supply and current through the load increases and a third pair of switches defining a Discharge state in which the load is connected to the power supply and current through the load decreases, the method comprising generating a first PWM signal at the beginning of each pulse of a clock signal; generating a second PWM signal when a binary current error signal changes state; generating, at the beginning of each pulse of the clock signal, a Direction signal which is the inverse of the current error signal; and placing the amplifier in the idle state when the second PWM signal is present and otherwise placing the amplifier in the Charge state for one state of the Direction signal and placing the switches in the Discharge state for the other state of the Direction signal.

14 Claims, 6 Drawing Sheets

CURRENT MODE SWITCHING FOR TRI-STATE AMPLIFIERS IN MAGNETIC BEARING CONTROL SYSTEMS

RELATED APPLICATIONS

This application is a continuation application of International Application Number PCT/CA98/00339, filed Apr. 9, 1998 which in turn claims priority to Canadian Application Number 2,202,442, filed on Apr. 11, 1997, both of which are hereby incorporated by reference.

The present invention relates, in general to magnetic bearings and, more specifically, to a method and a circuit for controlling an H-bridge arrangement of power switches.

BACKGROUND OF THE INVENTION

Active magnetic bearings are used to suspend shafts of rotating equipment subject to load spectra which vary with respect to time. Control of the position of the rotating assemblies of such equipment is effected by electromechanical systems which combine the use of feedback control and switching amplifiers. For the practical application of such systems in industrial rotating machinery, the output of these amplifiers must vary in the order of thousands of cycles per second in order to maintain or adjust the desired position. Furthermore, the application demands that only switching amplifiers be used for reasons of efficiency.

The following discussion describes amplifiers used in magnetic bearing applications and the schemes used to control them in this application.

Switching amplifiers are almost exclusively used for magnetic bearing applications over analog amplifiers because of their much higher efficiency. Switching amplifiers have efficiencies which typically are above 90%, while analog amplifiers have efficiencies which are typically below 20%. This makes analog amplifiers impractical except for magnetic bearings with very low power requirements.

As shown in FIG. 1, a bi-directional switching amplifier 10 normally consists of an H-bridge arrangement of power switches. The H-bridge comprises two switching legs 12 and 14 with a load 16, such as a bearing coil, connected between the two switch legs 12 and 14. Leg 12 is provided with switches 18 and 20. Leg 14 is provided with switches 22 and 24. Legs 12 and 14 are connected in parallel with a power supply 26 and a capacitor 28. Each power switch is typically in the form of a field effect transistor (FET) and is responsive to a control signal 30. Two schemes are used to control the switches to allow the current to track the setpoint: bi-state switching and tri-state switching.

Bi-state switching, also known as Phase Anti-Phase Switching, uses a single control bit to control the amplifier switches. This is illustrated in FIGS. 2a and 2b. The switches operate in pairs. In State 1 (FIG. 2a), switches 18 and 24 (Amplifier pair A) are closed when the current in the amplifier 10 is increasing, while switches 20 and 22 (Amplifier pair B) are open. Conversely, in State 2 (FIG. 2b), switches 20 and 22 are closed and switches 18 and 24 are opened, and the current is decreasing. The energy is switched back and forth between the bearing coil 16 inductance and the large electrolytic capacitor 28 which lies across the power supply 26. Resistance losses from this arrangement are replenished from the power supply 26.

When the amplifier 10 is controlling a steady state current, the duty cycle of the control bit is close to 50%. The duty cycle rises to increase the current level and falls to decrease the current level. As mentioned, bi-state switching is controlled by one control bit.

The disadvantage of this scheme is the high level of switching losses and alternating current imposed on capacitor 28. These losses are incurred when switching a field effect transistor (FET) ON or OFF. When a FET is fully ON, it has very low resistance losses because of the low voltage drop across the device, and when the FET is OFF, the resistance losses are also low because the current is negligible. However, when a FET is in the process of turning ON or OFF, it has both current and voltage across it, and, as a result, it generates and dissipates heat. The amount lost during a switching action is determined by how fast the FET can be switched. The switching speed is limited by voltage spikes that can become large enough to destroy the device. Bi-state switching of the amplifier 10 requires four switching actions of the FETs per cycle.

Switching amplifiers must have large electrolytic capacitors across the supply in order to reduce the voltage variation. The bi-state switching places a square wave across the capacitor with a peak current equal to twice the load current. This current requires that very large capacitance be used in order to reduce the internal resistance of the capacitor, and thus limit the heating of the capacitor. The heating of the electrolytic capacitor reduces its life span.

The most common method of switching a bi-state amplifier 10 with a single control bit is pulse-width modulation (PWM) control. A triangle PWM wave is compared to an error signal for the amplifier 10. The error signal is a setpoint minus a current feedback signal. When the PWM wave is above the error signal, Amplifier pair A (switches 18 and 24) is active. When the PWM wave is below the error signal, Amplifier pair B (switches 20 and 22) is active.

The phase width of the amplifier is controlled by the gain in the circuit. The higher the gain, then the larger the bandwidth, and the wider range of control is available to the magnetic bearing system, which is desirable. The maximum gain is limited by the slope of the PWM triangle. The error triangle that results must not have a steeper slope than the PWM signal, or the amplifier will start switching in an unstable fashion and the amplifier will destroy itself. The slope of the error triangle is determined by the amplifier feedback gain and ratio of voltage to inductance (V/L). The amplifier gain must be changed whenever the supply voltage or the bearing coil 16 inductance is changed. This results in amplifiers with a unique gain setting for each size of magnetic bearing actuator. This increases the costs of the amplifiers, which is undesirable. The triangle PWM wave is double the slope compared to a saw tooth PWM wave and allows the current to switch around the setpoint. The slope of the PWM wave can also be increased by increasing the switching frequency, but the switching losses in the amplifier 10 also increase.

The second method used to control bi-state magnetic bearings is called Current Mode Switching. Amplifier pair A is turned ON periodically by a clock and remains ON until the current reaches the setpoint. Amplifier pair B then remains ON until the next clock. This method has a higher bandwidth, but there is always an error between the setpoint and the current which is equal to half the ripple current. The bandwidth of the amplifier is not highly dependent on the V/L ratio which allows a single design of amplifier to serve a wide range of magnetic bearing actuator sizes.

Tri-state switching uses two bits to control the FETs: a PWM bit and a Direction bit. The Direction control bit determines whether the current is decreasing or increasing.

The PWM bit determines whether the bearing is connected to the power supply or is simply circulating current around the inductive load. The three states for a switching amplifier are shown in FIGS. 3a, 3b and 3c.

FIGS. 3a, 3b and 3c depict current paths within the amplifier during Discharge, Idle, and Charge states, respectively. The current-voltage relationship of the inductive load is defined by the differential equation v=−L(di/dt), where i is the current flowing through the load. Thus, the current through the load increases or decreases exponentially if a fixed voltage is applied across the load and tends to remain constant if the ends of the load are shorted together. In the Discharge state, shown in FIG. 3a, switches 18 and 24 are closed, thereby applying a voltage across the load. Therefore, the current flow decreases exponentially from zero to a steady-state value. Once the desired current through the load has been attained, switch 18 is opened and switch 20 is closed so that the Idle state illustrated in FIG. 3b is entered. In this state, the ends of the load are shorted together and the current tends to remain constant except for decay due to resistive losses. Finally, when it is desired to increase the current flowing in the load, both switches 18 and 24 are opened and switches 20 and 22 are closed so that the Charge state illustrated in FIG. 3c is entered. In this state, the power supply voltage is applied across the load in a polarity opposite that of the Discharge state. Thus, the current flowing through the load increases exponentially.

The tri-state amplifier always goes into State 2, the Idle state, after being in charge or discharge State. This means the amplifier makes only two switches during a switching cycle instead of four. An amplifier running with tri-state switching, therefore, has only half the switching losses of the same amplifier run in a bi-state switching mode, an advantage which is desirable.

The second advantage to tri-state switching is that the current on the electrolytic capacitor is greatly reduced. This is because the current in the bearing is circulated in the bearing in the Idle State instead of being placed back on the capacitor. The lower current in the capacitor will reduce heating and extend the capacitor life. This increases the reliability of the system which is very desirable.

The common method controlling tri-state switching is PWM using a saw tooth reference. A saw tooth PWM wave is compared against the feedback error. At the beginning of the saw tooth, the direction bit is set depending on whether the feedback error is negative or positive. The PWM remains asserted until the feedback error is less than the PWM signal. Once again, the slope of the feedback error must not be above the slope of the PWM saw tooth reference, and the feedback gain requires different settings for different sizes of bearing actuator.

SUMMARY OF THE INVENTION

The present invention seeks to provide a new method and control circuit for switching such amplifiers to provide a more efficient use of power, resulting in less generation of resistance losses which manifests itself as heat. The switching method of the present invention results in lower operating temperatures which extend the life expectancy and improve the reliability, of magnetic bearing systems. The present invention combines the bandwidth advantage of current mode switching with the low ripple current advantage of tri-state switching. The current mode switching is insensitive to the bearing size so that gains need not be customized as with PWM switching. The tri-state switching means that the switching losses are reduced by half and that the supply capacitor can be smaller and will last longer because of less heating as a result of the lower ripple current.

In accordance with one aspect of the present invention, there is provided a method of controlling switching of a tri-state switching amplifier having two switching legs, two switches in each leg, and a load connected to the junction between the switches of each leg, a power supply and a capacitor connected to the opposite ends of each leg, a first pair of the switches defining an idle state in which current circulates through the load and the first pair of switches, a second pair of the switches defining a Charge state in which the load is connected to the power supply and current through the load increases and a third pair of switches defining a Discharge state in which the load is connected to the power supply and current through the load decreases, the method comprising generating a first PWM signal at the beginning of each pulse of a clock signal; generating a second PWM signal when a binary current error signal changes state; generating, at the beginning of each pulse of the clock signal, a Direction signal which is the inverse of the current error signal; and placing the amplifier in the idle state when the second PWM signal is present and otherwise placing the amplifier in the Charge state for one state of the Direction signal and placing the switches in the Discharge state for the other state of the Direction signal.

In accordance with another aspect of the present invention, there is provided a control circuit for controlling switching of a tri-state switching amplifier having two switching legs, two switches in each leg, and a load connected to the junction between the switches of each leg, a power supply and a capacitor connected to the opposite ends of each leg, a first pair of the switches defining an idle state in which current circulates through the load and the first pair of switches, a second pair of the switches defining a Charge state in which the load is connected to the power supply and current through the load increases and a third pair of switches defining a Discharge state in which the load is connected to the power supply and current through the load decreases, comprising: means for generating a first PWM signal at the beginning of each pulse of a clock signal; means for generating a second PWM signal when a binary current error signal changes state; means for generating, at the beginning of each pulse of the clock signal, a Direction signal which is the inverse of the current error signal; and switch driver means responsive to the PWM and Direction signals for placing the amplifier in the idle state when the second PWM signal is present and otherwise placing the amplifier in the Charge state for one state of the Direction signal and placing the switches in the Discharge state for the other state of the Direction signal.

BRIEF DESCRIPTION OF THE DRAWINGS

These and other features of the invention will become more apparent from the following description in which reference is made to the appended drawings in which.

DETAILED DESCRIPTION OF PREFERRED EMBODIMENTS OF THE INVENTION

Figure 1:
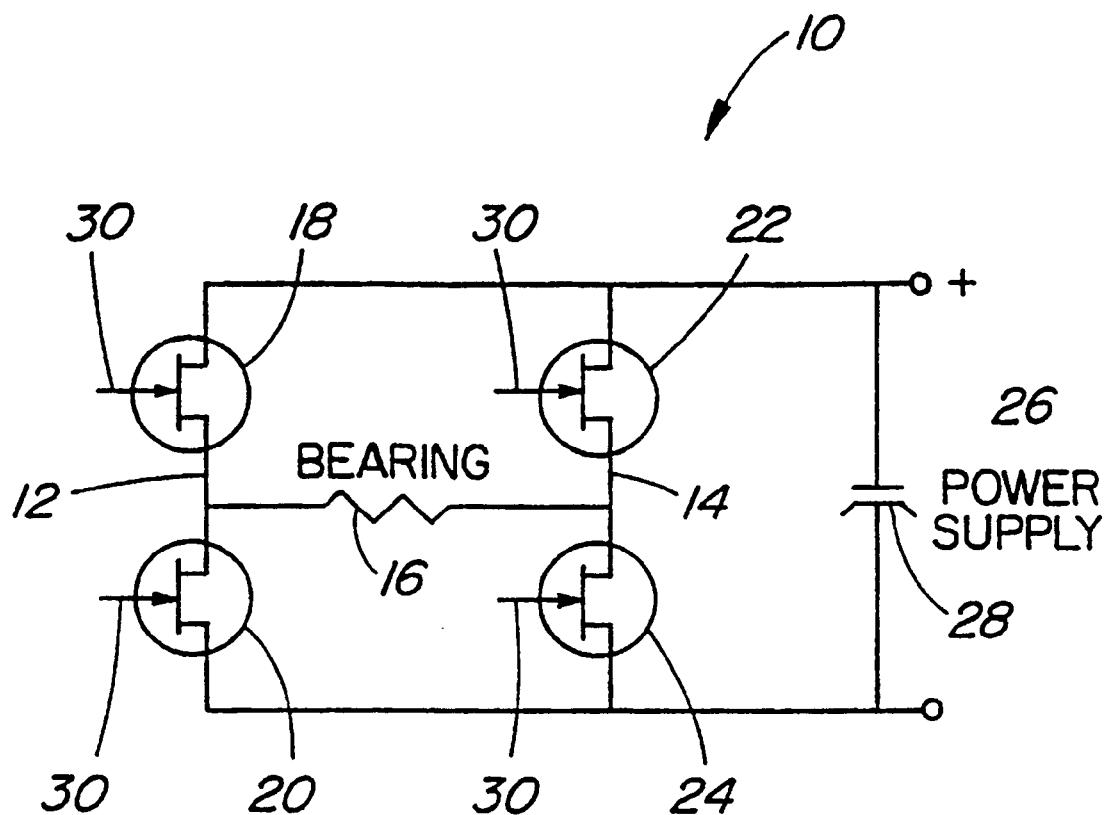
FIG. 1 is a diagrammatic illustration of a known H-Bridge Switching Amplifier.
Figure 2A:
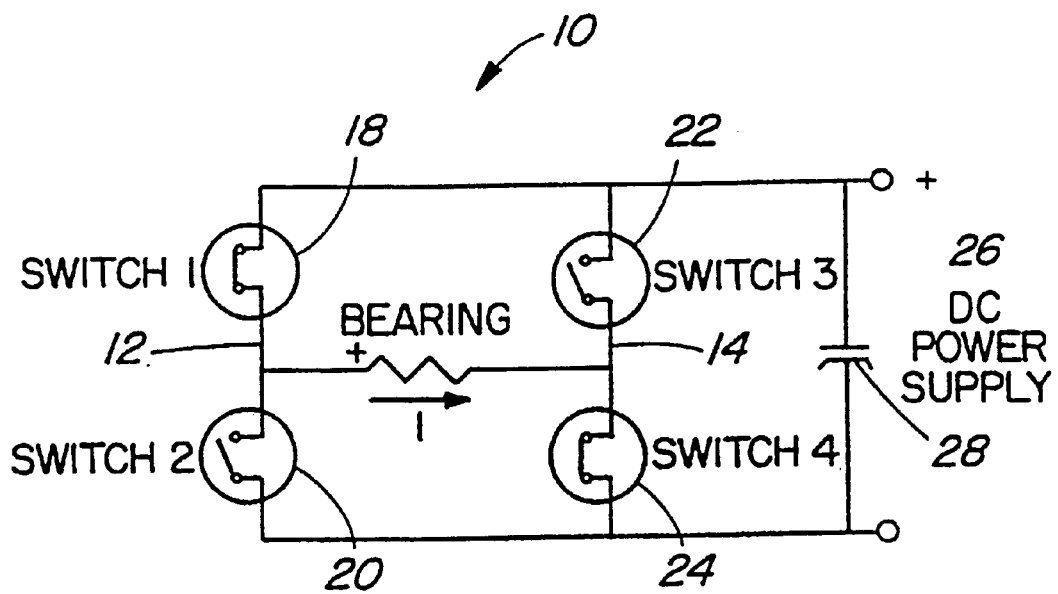
FIG. 2a illustrates State 1 for a known Bi-State Amplifier.
Figure 2B:
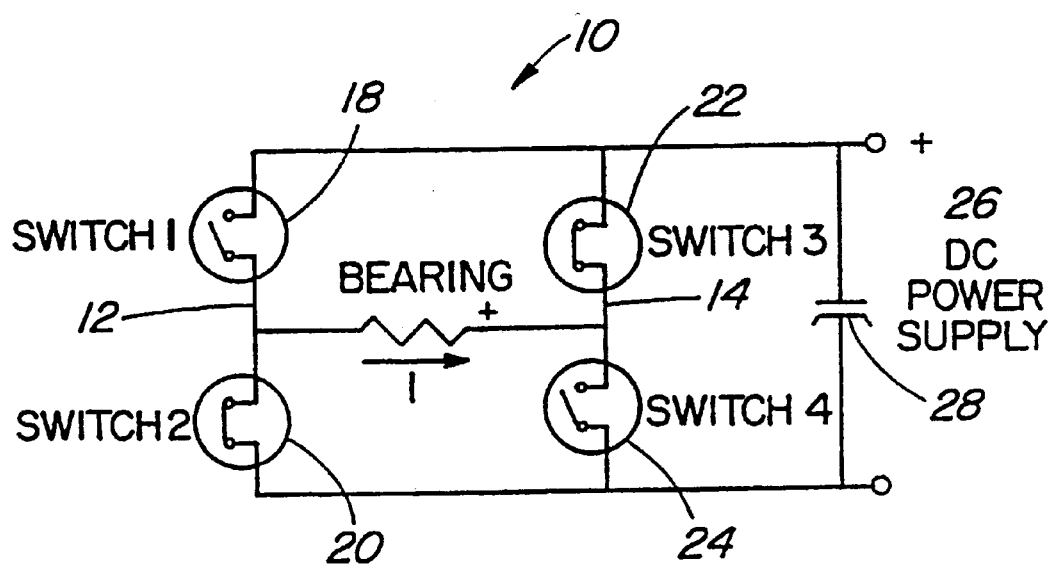
FIG. 2b illustrates State 2 for a known Bi-State Amplifier.
Figure 3A:
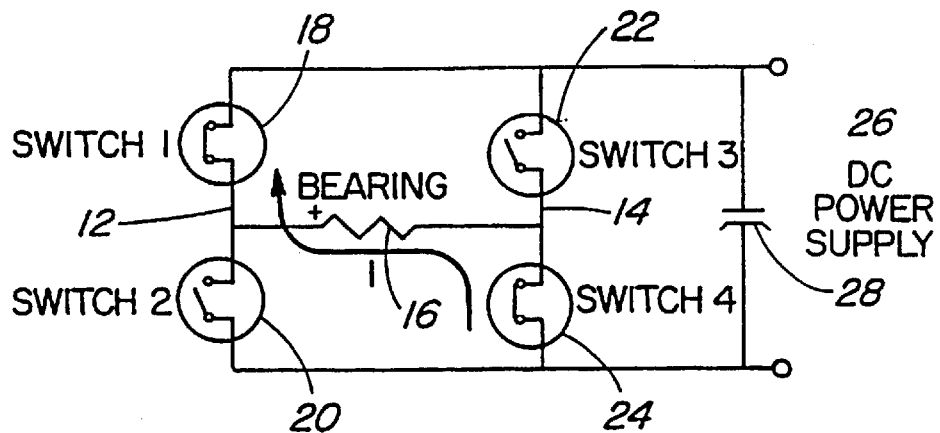
FIG. 3a illustrates a current increasing or charge state of a conventional Tri-State Amplifier.
Figure 3B:
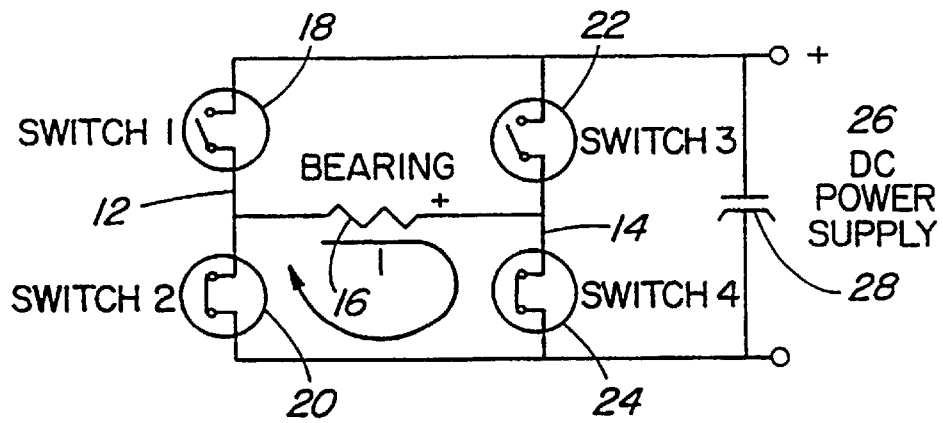
FIG. 3b illustrates current circulating or idle state of a conventional Tri-State Amplifier.
Figure 3C:
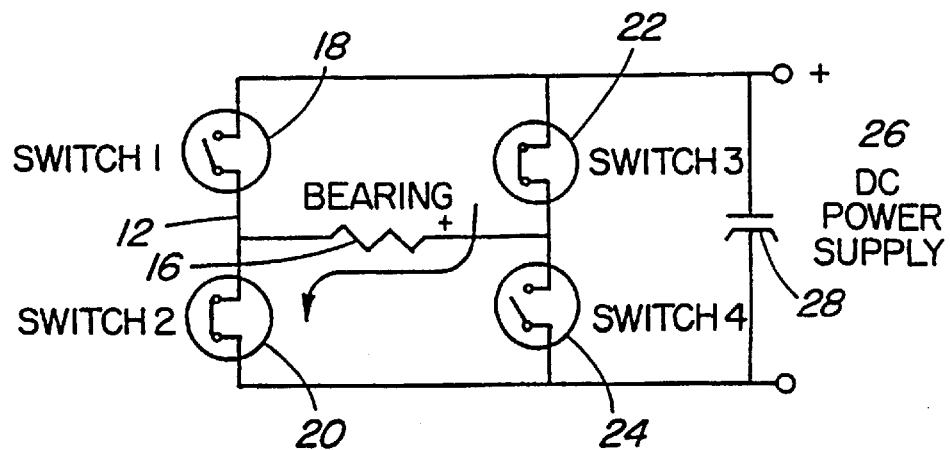
FIG. 3c illustrates current decreasing or discharge state of a conventional Tri-State Amplifier.
Figure 4:
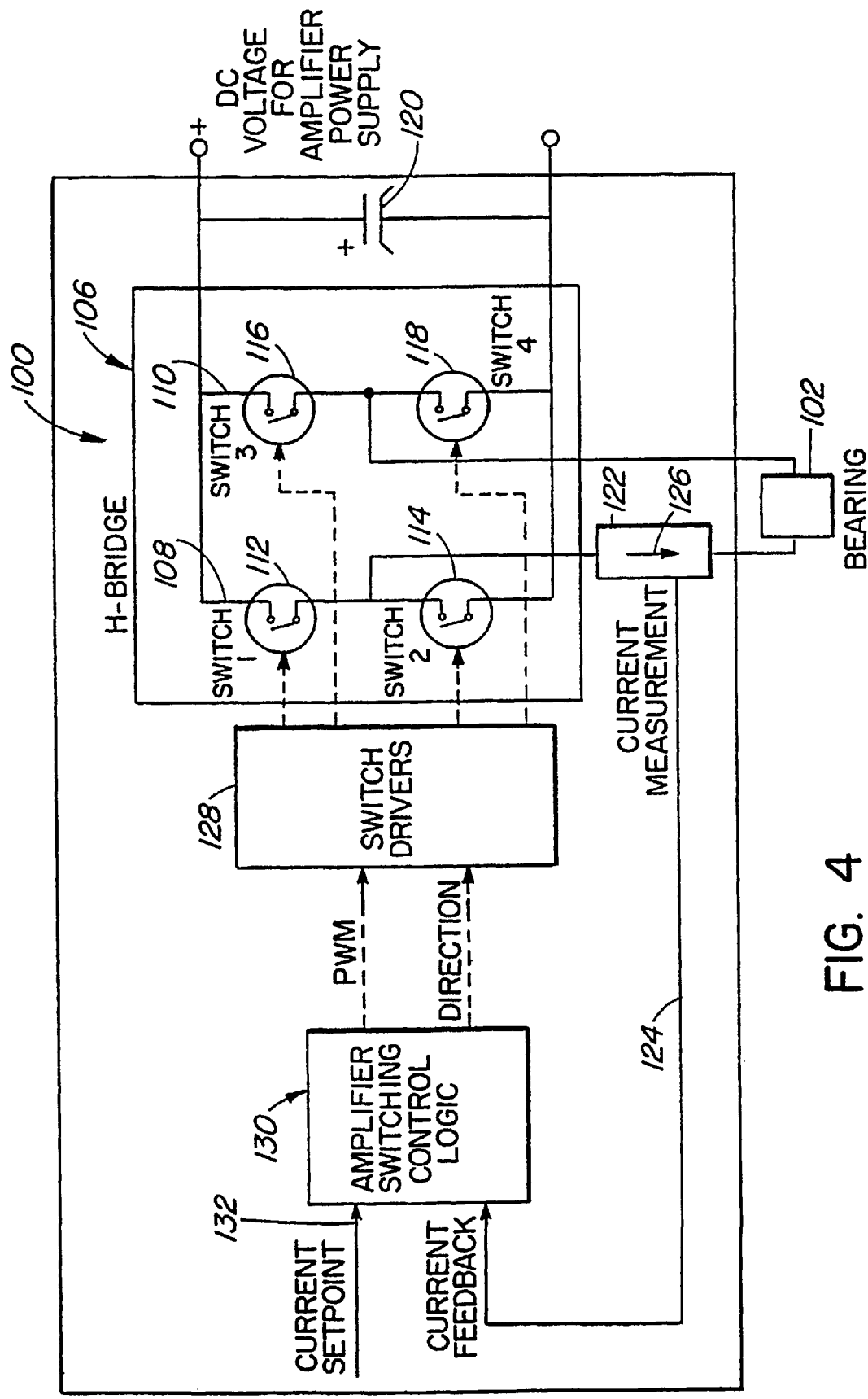
FIG. 4 illustrates a Tri-State Amplifier with current mode switching according to a preferred embodiment of the present invention.
Figure 5:
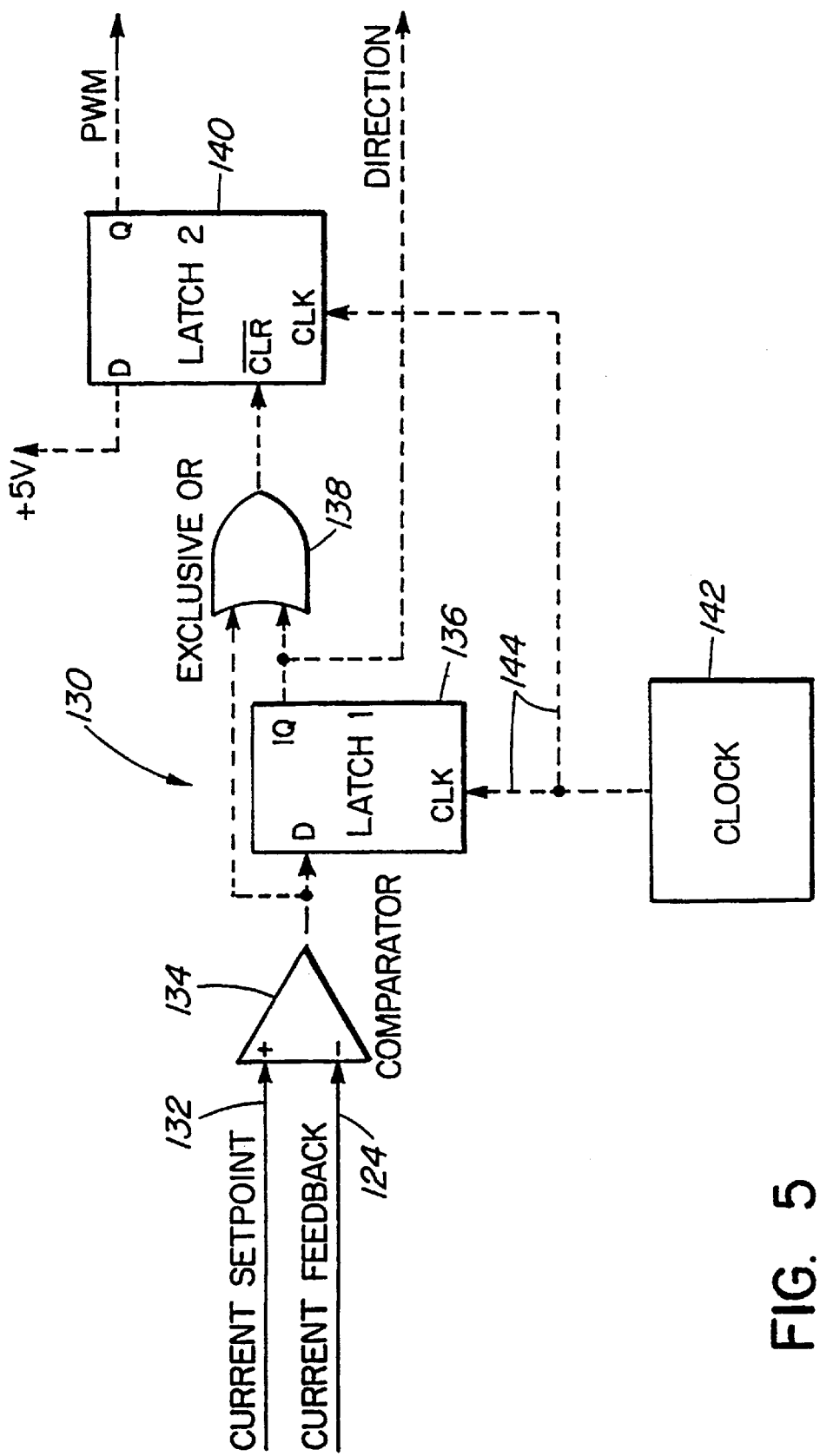
FIG. 5 illustrates an amplifier switching control circuit according to a preferred embodiment of the present invention.

FIGS. 4 and 5 illustrate a preferred embodiment of the present invention within the context of the magnetic bearing application, and the detail of the actual switch control itself.

FIG. 4 is a schematic representation of the tri-state current mode amplifier 100 connected to a magnetic bearing 102 having a bearing coil situated across an H-bridge 106 having switching legs 108 and 110 with leg 108 having switches 112 and 114 and leg 110 having switches 116 and 118. High voltage DC power is supplied to the H-bridge 106 across a capacitor 120. Capacitor 120 supplies the high frequency current r equirements of the H-bridge 106. A current sensor 122 measures the current in the bearing coil and converts it into a voltage that is used as a feedback signal 124. Positive current is defined to be in the direction of the arrow 126.

Switch drivers 128 use two digital signals, a PWM signal and a DIRECTION signal, generated by the control circuit 130 illustrated in detail in FIG. 5, to turn the switches ON and OFF u sing t he following logic table:

| PWM | Direction | 18 | 20 | 22 | 24 | Current |
|---|---|---|---|---|---|---|
| High | High | ON | OFF | OFF | ON | decreasing |
| high | Low | OFF | ON | ON | OFF | increasing |
| Low | X don't care | OFF | ON | OFF | ON | circulating |
| Low | X don't care | ON | OFF | ON | OFF | circulating |

By way of overview of the method of the present invention, a first PWM signal is generated at the beginning of each pulse of a clock signal and a second PWM signal when a binary current error signal changes state. At the beginning of each pulse of the clock signal, a DIRECTION signal is generated by inverting a binary current error signal. The amplifier is placed in the idle state when the second PWM signal is present and otherwise the amplifier is placed in the Charge state for one state of the DIRECTION signal and in the Discharge state for the other state of the DIRECTION signal.

Amplifier switching logic circuit 130 generates the PWM and DIRECTION signals based on a current setpoint signal 132 and the current feedback signal 124 and whether the current feedback signal crosses the setpoint. The current setpoint signal 132 and the current feedback signal 124 are both analog voltage signals. The amplifier switching logic 130 seeks to make the current in the bearing coil follow the setpoint while only switching the amplifier at a set frequency defined by a clock signal.

Referring to FIG. 5, control circuit 130 will be seen to comprise a comparator 134, a first latch 136, an Exclusive OR (XOR) gate 138 and a second latch 140. A clock 142 applies a clock signal 144 to each of latches 136 and 140 as shown.

Comparator 134 compares the current feedback signal 124 to the current setpoint signal 132 and outputs a binary current error signal of HIGH or LOW. When the setpoint is above the feedback current, the output is HIGH; when the setpoint is below the feedback current, the output is LOW. The output of the comparator 132 is applied to one input of XOR gate 138 and to the D input of latch 136.

Latch 136 generates the DIRECTION signal by inverting the current error signal output by the comparator. More specifically, latch 136 stores the state of the comparator output with every rising clock edge of clock signal 144. The complementary output, IQ, from the latch is the DIRECTION signal for the amplifier 100. The DIRECTION signal is applied to the second input of the XOR gate 138. The DIRECTION signal ensures that the amplifier drives the current toward the setpoint. A HIGH DIRECTION signal means the amplifier should reduce the bearing current while the PWM signal is HIGH.

The XOR gate 138 serves as a transition or threshold detector, i.e. it determines when the current crosses the setpoint in either direction. The XOR output, a transition signal, is LOW when both of its inputs, the current error signal and the DIRECTION signal, are equal, i.e. both HIGH or both LOW. The output of the XOR gate is applied to the asynchronous clear input of latch 138.

The second latch 140 generates the binary PWM signal. Latch 140 is latched HIGH on every rising edge of the clock signal. The output, Q, of latch 140 remains HIGH until the output is cleared by a LOW signal on its asynchronous clear input. The clear signal is generated by a LOW signal from the XOR gate 140. The PWM signal is HIGH from the rising clock edge until the current crosses the setpoint. The current is driven up or down, depending on the value of the DIRECTION signal, whenever the PWM signal is HIGH. The current is circulates around the bearing when the PWM signal is LOW.

Figure 6:
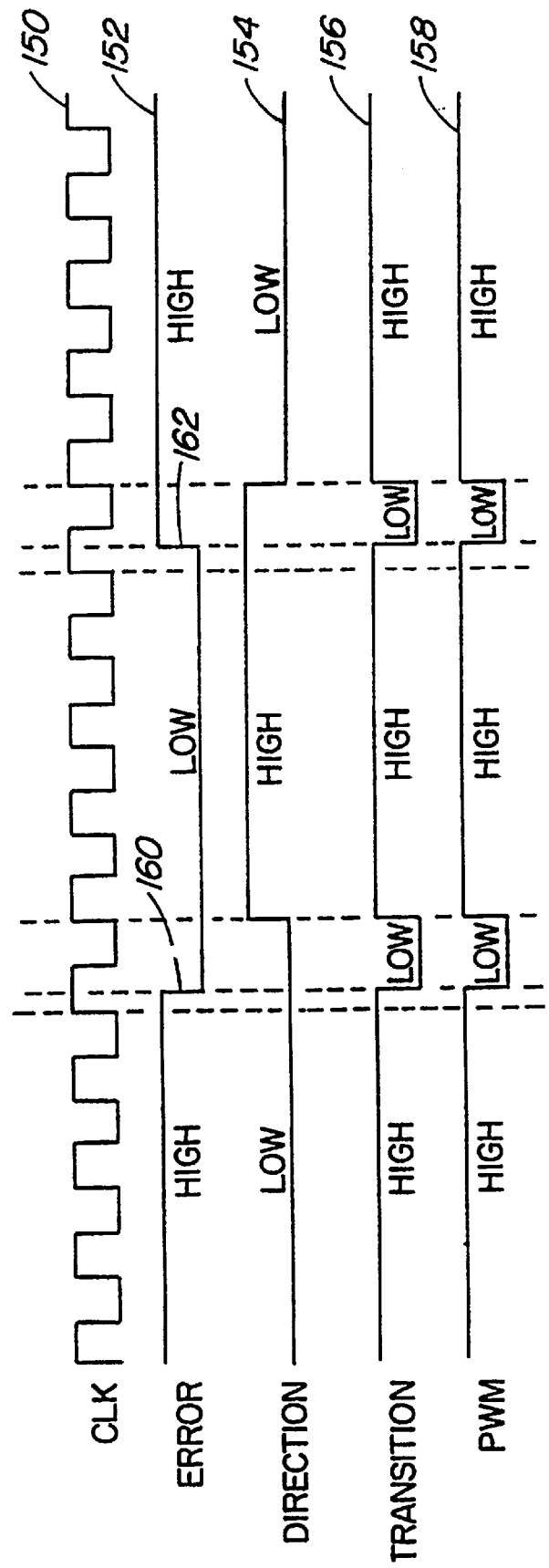
FIG. 6 illustrates a timing diagram illustrating the timing of the signals generated by the components illustrated in the control circuit of FIG. 5.

Referring to FIG. 6, waveform 150 is the clock signal, waveform 152 is the current error signal, waveform 154 is the DIRECTION signal, waveform 156 is the transition signal and waveform 168 is the PWM signal. The waveforms illustrate two transitions at 160 and 162. In the example, the current error signal is initially HIGH which means that the current is less than the setpoint. The DIRECTION signal is LOW and the PWM signal is HIGH which places the Amplifier in the Charge state to steer the current up towards the setpoint. At transition 160, the current crosses the setpoint., which changes the error signal to LOW, which is immediately applied to the XOR gate. However, the DIRECTION signal will not change until the next rising edge of the clock signal. Thus, for the balance of the that clock cycle, the current error signal and the DIRECTION signal are both LOW, which causes the output of the XOR gate, the transition signal, to go LOW, which, in turn, causes the PWM signal to go LOW. This causes the switch drivers to switch the Amplifier to the Idle state.

As soon as the DIRECTION signal goes HIGH, on the next rising edge of the clock signal, the transition signal goes HIGH because the current error signal and DIRECTION signal will now be different. Concurrently, the PWM signal is latched HIGH on the rising edge of the clock. With both the PWM signal and the DIRECTION signal HIGH, the switch drivers switch the Amplifier to the Discharge state.

At transition 162, the current again crosses the setpoint, but this time in the opposite direction. This changes the error signal to HIGH, which is immediately applied to the XOR gate. However, again, the DIRECTION signal will not change until the next rising edge of the clock signal. Thus, for the balance of the current clock cycle, the current error signal and the DIRECTION signal are both HIGH, which causes the output of the XOR gate, the transition signal, to go LOW, which, in turn, causes the PWM signal to go LOW. This causes the switch drivers to switch the Amplifier to the Idle state.

As soon as the DIRECTION signal goes LOW, on the next rising edge of the clock signal, the transition signal goes HIGH because the current error signal and DIRECTION signal will now be different. Concurrently, the PWM signal is latched HIGH on the rising edge of the clock. With the PWM signal HIGH and the DIRECTION signal LOW, the switch drivers switch the Amplifier to the Charge state.

It will be seen that when the PWM signal is LOW, the amplifier is in the Idle state and when the PWM signal is HIGH, the DIRECTION signal determines which of the Charge and Discharge states the amplifier will be placed by the switch drivers. When the DIRECTION signal is LOW, the amplifier is placed in the Charge state. When the DIRECTION signal is HIGH, the amplifier is placed in the Discharge state.

It will be understood that various modifications and alterations may be made to the method and control circuit described above without departing from the spirit of the following claims.

We claim:

1. A method of controlling switching of a tri-state switching amplifier having two switching legs, two switches in each leg, and a load connected to the junction between the switches of each leg, a power supply and a capacitor connected to the opposite ends of each leg, a first pair of said switches defining an idle state in which current circulates through said load and said first pair of switches, a second pair of said switches defining a Charge state in which said load is connected to said power supply and current through said load increases and a third pair of switches defining a Discharge state in which said load is connected to said power supply and current through said load decreases, comprising:

(a) generating a first PWM signal at the beginning of each pulse of a clock signal;

(b) generating a second PWM signal when a binary current error signal changes state;

(c) generating, at the beginning of each pulse of said clock signal, a Direction signal which is the inverse of said current error signal; and (d) placing said amplifier in said idle state when said second PWM signal is present and otherwise placing said amplifier in said Charge state for one state of said Direction signal and placing said Amplifier in said Discharge state for the other state of said Direction signal.

2. A method as defined in claim 1, said step of generating a second PWM signal comprising:

(a) continuously comparing the current flowing through said load and generating a binary error signal indicative of whether the current is above or below the setpoint; and (b) continuously comparing said error signal and Direction signal and generating said second PWM signal when the said error and Direction signals are equal.

3. A method as defined in claim 2, said step of generating a Direction signal comprising inverting said error signal.

4. A method as defined in claim 1, said step of generating a Direction signal comprising inverting said error signal.

5. A method of controlling switching of a tri-state switching amplifier for use in a magnetic bearing, said amplifier having two switching legs, two switches in each leg, and a bearing coil connected to the junction between the switches of each leg, a power supply and a capacitor connected to the opposite ends of each leg, a first pair of said switches defining an idle state in which current circulates through said load and said first pair of switches, a second pair of said switches defining a Charge state in which said load is connected to said power supply and current through said load increases and a third pair of switches defining a Discharge state in which said load is connected to said power supply and current through said load decreases, comprising:

(a) generating a first PWM signal at the beginning of each pulse of a clock signal;

(b) continuously comparing the current flowing through said bearing coil and generating a binary current error signal indicative of whether the current is above or below the setpoint;

(c) generating, at the beginning of each pulse of said clock signal, a Direction signal by inverting of said current error signal;

(d) continuously comparing said error signal and Direction signal and generating a second PWM signal when the said error and Direction signals are equal;

(e) placing said amplifier in said idle state when said second PWM signal is present and otherwise placing said amplifier in said Charge state for one state of said Direction signal and placing said switches in said Discharge state for the other state of said Direction signal.

6. A control circuit for controlling switching of a tri-state switching amplifier having two switching legs, two switches in each leg, and a load connected to the junction between the switches of each leg, a power supply and a capacitor connected to the opposite ends of each leg, a first pair of said switches defining an idle state in which current circulates through said load and said first pair of switches, a second pair of said switches defining a Charge state in which said load is connected to said power supply and current through said load increases and a third pair of switches defining a Discharge state in which said load is connected to said power supply and current through said load decreases, comprising:

(a) means for generating a first PWM signal at the beginning of each pulse of a clock signal;

(b) means for generating a second PWM signal when a binary current error signal changes state;

(c) means for generating, at the beginning of each pulse of said clock signal, a Direction signal which is the inverse of said current error signal; and (d) switch driver means responsive to said PWM and Direction signals for placing said amplifier in said idle state when said second PWM signal is present and otherwise placing said amplifier in said Charge state for one state of said Direction signal and placing said switches in said Discharge state for the other state of said Direction signal.

7. A control circuit as defined in claim 6, further including comparator means for continuously comparing the current flowing through said load and generating a binary error signal indicative of whether the current is above or below the setpoint; and means for continuously comparing said error signal and said Direction signal and generating said second PWM signal when said error and Direction signals are equal.

8. A control circuit as defined in claim 7, said means for generating a Direction signal including latch means responsive to said clock signal for inverting said error signal.

9. A control circuit as defined in claim 6, said means for generating a Direction signal including latch means responsive to said clock signal for inverting said error signal.

10. A control circuit for controlling switching of a tri-state switching amplifier for use in a magnetic bearing having a bearing coil, said amplifier having two switching legs, two switches in each leg, said bearing coil connected to the junction between the switches of each leg, a power supply and a capacitor connected to the opposite ends of each leg, a first pair of said switches defining an idle state in which current circulates through said load and said first pair of switches, a second pair of said switches defining a Charge state in which said load is connected to said power supply and current through said load increases and a third pair of switches defining a Discharge state in which said load is connected to said power supply and current through said load decreases, comprising:

(a) clock means for generating a clock signal at a predetermined frequency;

(b) latch means responsive to said clock signal for generating a first PWM signal at the beginning of each pulse of a clock signal and responsive to current state transition signal for generating a second PWM signal when a binary current error signal changes state;

(c) latch means responsive to said clock signal for generating, at the beginning of each pulse of said clock signal, a Direction signal by inverting said current error signal; and (d) switch driver means responsive to said PWM and Direction signals for placing said amplifier in said idle state when said second PWM signal is present and otherwise placing said amplifier in said Charge state for one state of said Direction signal and placing said switches in said Discharge state for the other state of said Direction signal.

11. A control circuit as defined in claim 10, further including an exclusive OR gate for comparing said current error signal and said Direction signal and generating said current transition signal when said current error signal and said Direction signals are equal.

12. A control circuit as defined in claim 10, further including comparator means for comparing the current flowing through said bearing coil against a setpoint signal and generating said binary current error signal.

13. A control circuit as defined in claim 12, further including a current sensor for continuously generating a signal representative of the current flowing through said bearing coil and applying said representative signal to said comparator means.

14. A control circuit as defined in claim 12, further including an exclusive OR gate for comparing said current error signal and said Direction signal and generating said current transition signal when said current error signal and said Direction signals are equal.

* * * * *